Figure 1:
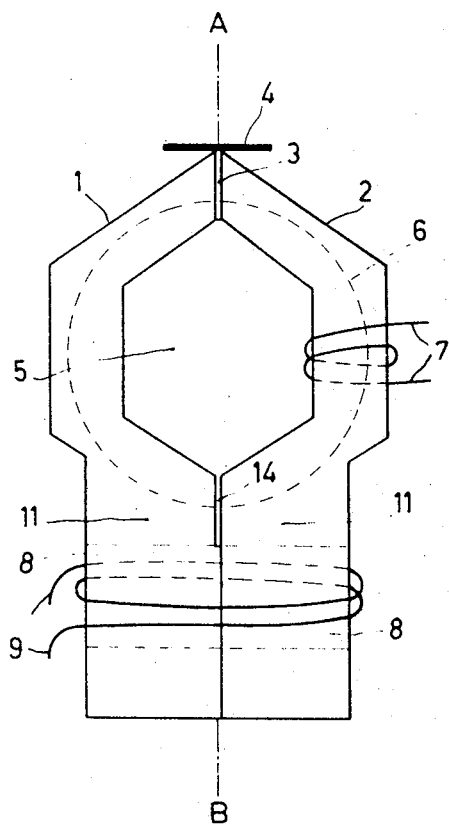

United States Patent Office 3,453,399
Patented July 1, 1969

3,453,399
MAGNETIC FLUX MEASURING DEVICE
Joseph Lodenwijk Maria Reijnders, Emmasingel, Eindhoven, Netherlands, assignor to U.S. Philips Corporation, New York, N.Y., a corporation of Delaware
Filed Sept. 2, 1966, Ser. No. 576,877
Claims priority, application Netherlands, Sept. 14, 1965, 6511919
Int. Cl. G11b 5/30, 5/46; G01r 33/02
U.S. Cl. 179—100.2     3 Claims This invention relates to magnetic devices and more particularly to a device for measuring magnetic flux in a circuit of magnetic material.

Circuits and devices of the foregoing description find application as magnetic reading heads for measuring or reading a signal recorded on a carrier such as a magnetic tape or drum. In certain types of reading heads, the electric signal produced in the head output winding is proportional to the rate of variation of electric flux. These types of heads are therefore not suitable for reading non varying or D.C. flux components.

In overcoming this drawback, it has been the practice to construct a modulating reading head having applied thereto a high frequency oscillatory signal for modulating the flux to be measured. Such constructions have taken the form of a first and second magnetic circuit mutually arranged with a common portion and composed of a magnetic material having a non linear magnetization characteristic. The first magnetic circuit constitutes the actual reading circuit whereas the second circuit constitutes the modulation circuit. The two circuits and the common portion are so arranged that an A.C. or alternating magnetic flux produced in the second magnetic circuit produces lines of force in the common portion which are substantially orthogonal or at right angles to the lines of force produced by the magnetic flux in the first circuit. Since the first and second circuits actually intersect each other orthogonally, the A.C. or alternating magnetic flux of the second circuit will effectively penetrate further into the first or reading circuit but, more particularly, will not be capable of producing undersired effects near the reading gap, such as erasing information on the carrier.

The operation of the dual portion right angle modulating head described above is based on the recognition of the principle of periodically varying the magnetic resistance of a magnetic circuit by periodically varying the A.C. magnetic flux in the proximity of the common portion of two right angle magnetic circuits, thereby resulting in a like variation in flux throughout the first circuit. The first circuit flux variation results in a modulated high frequency signal which can be derived from the circuit by a suitable output winding.

Ane difficulty found in the foregoing modulated head arrangement is a lack of signal sensitivity.

It is accordingly a prime object of the invention to provide a magnetic flux measuring or reading device with a higher sensitivity than heretofore attainable.

It is a further object of the invention to provide a dual portion modulating magnetic head for measuring or reading magnetic flux with a higher sensitivity than heretofore attained.

It is a still further object of the invention to construct a dual portion modulating magnetic head for measuring or reading magnetic flux with a higher sensitivity than heretofore attained by a relatively simple, economical and practical construction technique during the assembly of said head.

In accordance with the invention, the sensitivity of the dual portion modulating head described above is significantly increased by providing an air gap in the common portion of the head. The air gap is positioned along a plane extending substantially orthogonally to the lines of force of the flux in the first circuit and substantially parallel to the lines of force of the flux in the second circuit so that only a relatively small portion of the flux in the first circuit will pass through the air gap.

Figure 2:
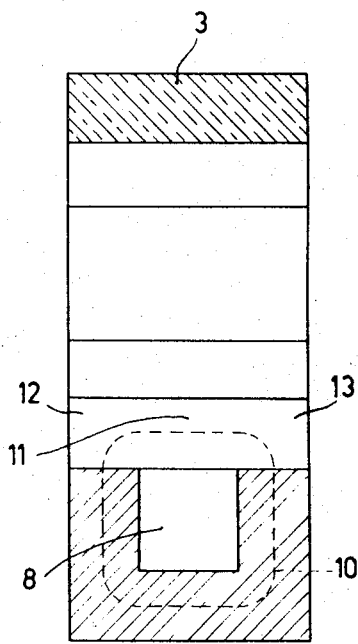

The foregoing objects, features and advantages will become apparent from the following description of a preferred embodiment taken in connection with the accompanying drawings wherein:

FIG. 1 is a plan view of a modulating reading head constructed in accordance with the present invention, and FIG. 2 is a cross sectional view taken on the line A–B.

Referring to the figures there is shown a preferred embodiment of a reading head constructed of two parts, 1 and 2, composed of a suitable magnetic material such as ferrite, which parts are mutually symmetrical and secured together by means of a suitable adhesive such as a glue. The upper portion of the head, at the junction between the parts 1 and 2, forms a reading gap 3 which may be filled with a suitable gap material such as glass. Under the influence of a carrier such as a magnetic tape or drum located in the proximity of the air gap 3, a magnetic flux will be produced within the first or upper portion of the magnetic circuit around the opening 5 between the parts 1 and 2. The lines of force generated by the magnetic field extend as diagrammatically denoted by the broken line 6. The aforementioned first circuit portion includes an output winding 7 magnetically coupled thereto. The parts 1 and 2 are further provided with an aperture 8, through which a winding 9 is threaded. Under the control of an alternating electric current traversing the winding 9, an alternating magnetic flux will be produced in the second portion of the magnetic circuit around the aperture 8. The lines of force resulting around the aperture 8 are illustrated diagrammatically by the broken line 10. The two magnetic circuit portions surrounding the openings 5 and 8 respectively are joined in a substantially orthogonal manner by means of a common portion 11. The lines of force of the flux to be measured in the circuit surrounding the opening 5, and the lines of force produced by the alternating magnetic flux in the circuit surrounding the aperture 8, are thus orthogonally positioned to one another within the part 11. It will therefore be observed that the entire reading head actually consists of two magnetic circuits which intersect each other in a substantially orthogonal relationship at the region 11. As a result of this configuration, substantially no alternating magnetic flux can penetrate into the circuit surrounding the opening 5 and thus into the air gap 3 of the first portion of the magnetic head or the output winding 7. The magnetization characteristic of the material comprising the parts 1 and 2 consists of a substantially non-linear magnetization shape and preferably constitutes a ferrite material having a relatively low saturation value. Under the influence of the alternating magnetic flux, the material at the region 11 is periodically saturated through maximum and minimum values twice per cycle. As a result of the permeability variation within the common part 11, the magnetic resistance of the circuit surrounding the opening 5 is thereby varied, and in accordance with this variation the flux to be measured in the circuit is modulated such that a modulated signal can be derived at the output winding 7. The amplitude of this signal is proportional to the flux being measured.

Standing alone, the reading head as described above has been found to be comparatively insensitive. More particularly, the variational range of the magnetic resistance in the circuit surrounding the opening 5 has shown to be comparatively low, for example, within the range of 3%. This percentile variation may be increased somewhat by conveying an excessively strong current through the winding 9, to at least at high as 10%. However, the use of such a strong current in and of itself gives rise to certain disadvantages including premature saturation of the magnetic circuit surrounding the opening 8, as a result of which undesirably strong leakage fluxes may be forced, thus resulting in penetration of the magnetic circuit surrounding the opening 5 and defeating the purpose of the head. It has further been found that common portion 11 of the above described magnetic head is difficult to saturate magnetically, particularly in the proximity of the corners 12 and 13. As a result, those parts of the common portion 11 which are poorly saturated magnetically have a comparatively high permeability and therefore constitute a magnetic short circuit across those parts which are properly saturated.

In accordance with this invention, it has been discovered that the sensitivity of the above described magnetic head can be considerably improved by providing an additional air gap 14 in the common portion 11 between parts 1 and 2. The plane of the gap 14 is arranged to extend parallel to the lines of force of the A.C. magnetic flux, therefore not influencing same and extending at right angles to the lines of force of the flux around the opening 5. As a result of the presence of the gap, the lines of force formed by the flux around the opening 5 are deflected so that only a small part thereof travels through the gap whereas the greater part of the lines of force are compelled to complete their circuit through those parts of the head forming the aperture 8, located lower in the figure, where the material can be more properly saturated. As a result of this measure, percentile variation of magnetic resistance around the aperture 8 can be increased, for example, to as much as 60% within a reasonable value of applied alternating current energy.

Gap 14 can be provided in a simple and economic manner by removing some material from one or both parts forming the head, as by a filing operation, before bonding the parts 1 and 2 against each other.

What is claimed is:
1. A magnetic flux measuring device comprising: a magnetic head including a first and second magnetic circuit portion joined by a common portion, said first and second circuit portions each having formed therein an aperture, each said aperture having an axis orthogonally placed with respect to the other, said first circuit portion having induced therein a magnetic flux to be measured, said second circuit portion having induced therein a modulating flux for causing said first circuit magnetic flux to be modulated, and an air gap, disposed in said common portion, said air gap positioned along a plane extending substantially orthogonally to the lines of force of flux in the said first circuit and substantially parallel to the lines of force of the flux in the said second circuit.

2. A device of the class described comprising: a block of magnetic material having a first flux path and a second flux path, said first and second flux paths being mutually perpendicular and overlapping in a common area adjoining said first and second flux paths, a first gap located in a plane perpendicular to said first flux path and isolated from said second flux path, and a second gap located in said common portion and positioned in a plane extending substantially orthogonally to said first flux path and substantially parallel to said second flux path.

3. A device for measuring magnetic flux comprising: a block of magnetic material having first and second openings therethrough, said first and second openings being mutually perpendicular and being separated by a common magnetic portion, a first flux path including the flux to be measured surrounding said first aperture, a second flux path including a modulating flux for said first flux path surrounding said second aperture, said first and second flux paths being mutually perpendicular and overlapping in the said common portion separating said first and second apertures, a first gap located in said first flux path in a plane substantially orthogonal to said first flux path, and a second gap located in said common portion and positioned along a plane extending substantially orthogonally to the said first flux path and substantially parallel to said second flux path.

References Cited

UNITED STATES PATENTS 2,608,621   8/1952   Peterson _____ 179—100.2
2,700,703   1/1955   Nordyke _____ 179—100.2

BERNARD KONICK, *Primary Examiner.*

J. R. GOUDEAU, *Assistant Examiner.*

U.S. Cl. X.R.

324—43, 47; 340—174.1